(12) United States Patent
Woodsum

(10) Patent No.: US 8,559,456 B2
(45) Date of Patent: Oct. 15, 2013

(54) BEAMFORMING DEVICES AND METHODS

(75) Inventor: Harvey C. Woodsum, Bedford, NH (US)

(73) Assignee: Hobbit Wave, Weston, MA (US)

( * ) Notice: Subject to any disclaimer, the term of this patent is extended or adjusted under 35 U.S.C. 154(b) by 32 days.

(21) Appl. No.: 13/301,393

(22) Filed: Nov. 21, 2011

(65) Prior Publication Data

US 2012/0064916 A1   Mar. 15, 2012

Related U.S. Application Data

(63) Continuation of application No. 12/372,454, filed on Feb. 17, 2009, now Pat. No. 8,064,408.

(60) Provisional application No. 61/030,013, filed on Feb. 20, 2008, provisional application No. 61/058,999, filed on Jun. 5, 2008, provisional application No. 61/122,503, filed on Dec. 15, 2008.

(51) Int. Cl.
*H04J 3/00* (2006.01)

(52) U.S. Cl.
USPC .................................................. 370/464

(58) Field of Classification Search
USPC .......... 370/464, 498, 534; 379/242, 258, 259; 455/130, 313, 323, 325, 329
See application file for complete search history.

(56) References Cited

U.S. PATENT DOCUMENTS

| | | | |
|---|---|---|---|
| 4,989,090 A * | 1/1991 | Campbell et al. ............. | 348/451 |
| 5,479,176 A | 12/1995 | Zavrel, Jr. | |
| 6,185,440 B1 | 2/2001 | Barratt et al. | |
| 6,229,486 B1 | 5/2001 | Krile | |
| 6,427,531 B1 * | 8/2002 | Chintawongvanich .... | 73/170.13 |
| 6,876,693 B2 | 4/2005 | Sim et al. | |
| 6,943,732 B2 | 9/2005 | Gottl et al. | |
| 6,947,470 B2 | 9/2005 | Berens | |
| 7,092,690 B2 | 8/2006 | Zancewicz | |
| 7,106,785 B2 | 9/2006 | Yoshida et al. | |
| 7,260,370 B2 | 8/2007 | Wang et al. | |
| 7,925,234 B2 | 4/2011 | Yeh et al. | |
| 8,064,408 B2 * | 11/2011 | Woodsum ..................... | 370/334 |
| 2005/0271016 A1 | 12/2005 | Kim et al. | |
| 2006/0244660 A1 * | 11/2006 | Ann et al. ..................... | 342/377 |
| 2007/0164902 A1 | 7/2007 | Bang et al. | |
| 2007/0189362 A1 * | 8/2007 | D'Amico et al. ............. | 375/148 |
| 2009/0239551 A1 * | 9/2009 | Woodsum .................. | 455/456.1 |

* cited by examiner

*Primary Examiner* — Fan Ng

(74) *Attorney, Agent, or Firm* — Wilmer Cutler Pickering Hale & Dorr LLP

(57) ABSTRACT

Devices and methods are provided for directionally receiving and/or transmitting acoustic waves and/or radio waves for use in applications such as wireless communications systems and/or radar. High directional gain and spatial selectivity are achieved while employing an array of receiving antennas that is small as measured in units of the wavelength of radio waves being received or transmitted, especially in the case of spatially oversampled arrays. Frequency/wavenumber, multi-dimensional spectrum analysis, as well as one-dimensional frequency spectrum analysis can be performed.

20 Claims, 12 Drawing Sheets

BEAMFORMING DEVICES AND METHODS

CROSS-REFERENCE TO RELATED APPLICATIONS

This application is a continuation of application Ser. No. 12/372,454, now U.S. Pat. No. 8,064,408, which claims priority to provisional application Ser. Nos. 61/030,013, entitled Beamforming Architecture, filed Feb. 20, 2008; 61/058,999, entitled Application of Harvey Matrix to Replica Correlation/Matched Filtering, filed Jun. 5, 2008; and 61/122,503, entitled Beamforming Device and Method using Hermetic Transform Processing, filed Dec. 15, 2008, all of which are incorporated herein by reference.

BACKGROUND

The present disclosures relate to a device and method for directionally receiving and/or transmitting radio waves.

Signals from a plurality of receiving elements configured as an array can be delayed, or equivalently phase-shifted, and combined (summed) to filter out signal arrivals from particular directions in order to create a set of directional 'beams' in physical space. Such beams may be used to improve the reception of signals in an interference background, such as the reception of cellular telephone signals in a radio frequency background dominated by signals originating within the same spatial cell of the mobile telephone network or from adjacent cells.

The same principle works for transmission of direction beams of radio waves as well. In this case, a signal to be directionally transmitted is replicated and phase shifted or delayed, as well as amplitude weighted and fed to the individual transmitting antenna elements, in order to produce desired directional beam characteristics.

For a uniformly sampled array, a fast and efficient form of digital processing that is commonly used to perform beamforming is the well-known 'Fast-Fourier Transform' or FFT, a fast version of the Discrete Fourier Transform, or DFT, and known as the 'Butler Matrix' in antenna theory.

With DFT/FFT processing, the degree to which frequencies or spatial directions can be resolved, known as the 'resolving power' of the system, is normally understood to be limited by the amount of signal observation time (the number of samples times the sampling time interval) in the case of frequency spectrum analysis; or in the case of beam formation, by the aperture size/array dimensions. For example, in the case of a linearly arranged set of receiving elements, an angular beam width (i.e., the spatial resolution for resolving signals arriving from differing directions) for a sufficiently well sampled aperture (spatial sampling no greater than one-half wavelength) is given by the well known 'diffraction limit', $\theta = \lambda/L$, where $\theta$ is the beam width, $\lambda$ is the wavelength corresponding to the incoming signal, and L is the aperture (array) dimension. This limitation often presents a problem to the system designer to whom this limit may appear to be a hard and fast limitation on either system size for a fixed beam resolution requirement or on system resolution where system size is constrained.

In the conventional process of beam formation, weighting factors are often applied to the channel data prior to the DFT transformation for the purposes of reducing spatial response in directions far from the main lobe of the spatial beam pattern. Beam response is reduced on secondary side lobes of the pattern, while the main lobe of the pattern is somewhat widened. See Monzingo and Miller, "Adaptive Arrays", John Wiley & Sons (1980), p. 274 (Butler Matrix).

In so-called 'super-gain' or 'super-directive' systems, weighting factors are applied to the channels, prior to the DFT transformation, for the purposes of narrowing the main lobe of the beam, especially in the case where the spacing between receiver elements is less than the required half wavelength. Weighting factors can be chosen in such cases to produce a consequent reduction in beam width (i.e., an increase in resolution), but in general with a loss of system sensitivity and bandwidth. See Doblinger, "Beamforming with Optimized Interpolated Microphone Arrays", IEEE HSCMA Conference Proceedings (2008), pp 33-37.

SUMMARY

The present disclosure relates to devices and methods for directionally receiving and/or transmitting radio waves for use in applications such as wireless communications systems and/or radar. In particular, devices and methods are provided for achieving higher directional gain and spatial selectivity while employing an array of receiving antennas that is small as measured in units of the wavelength of radio waves being received or transmitted, especially in the case of spatially over sampled arrays. The inventions can also be generalized to perform frequency/wavenumber, multi-dimensional spectrum analysis, as well as one-dimensional frequency spectrum analysis.

Non-Fourier transformation can be applied in beam formation, or in spectral analysis, as a replacement for conventional Fourier techniques, such as the DFT, to produce superior results under some circumstances. Specifically, a transformation can be selected, or designed, to provide a much higher resolution for the array, without the penalties normally encountered with the super-gain weighting approach. The present invention therefore makes use of an alternate form of transform, termed here a "Hermetic Transform," in place of a conventional DFT/FFT or time-domain equivalent, and resolution can be increased, in some cases substantially, as a result.

Other features and advantages will become apparent from the following detailed description and drawings.

DESCRIPTION

While the process of beam formation can be accomplished using either analog or digital hardware, in modern systems it is often the case that the phase-shifting, or equivalent time delay operations, as well as amplitude weighting of signal channels are accomplished using specialized digital hardware or programmable processors which process antenna signals that have been filtered, sampled, and digitized. Without loss of generality, an embodiment that is completely digital will therefore be described here to illustrate a representative case.

Figure 1:
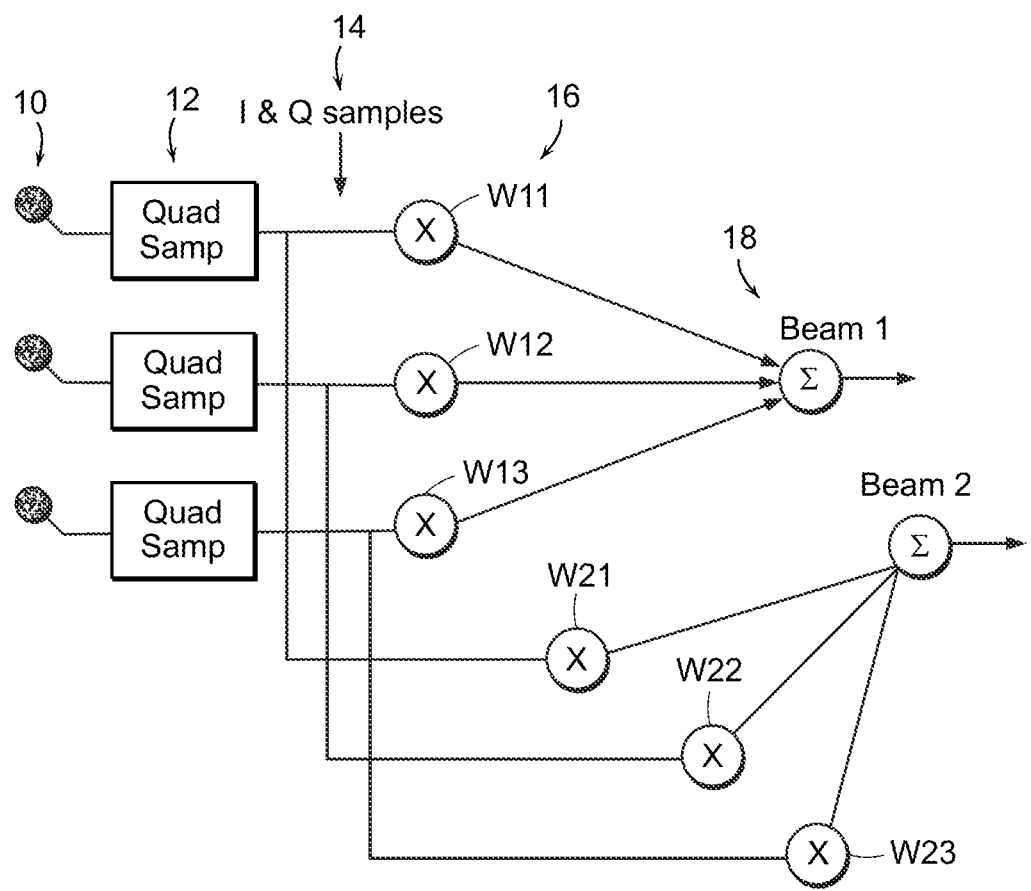
FIG. 1 is a schematic of a conventional method for producing a set of beams using complex weights.

FIG. 1 indicates a conventional method for producing a set of receiving beams (Beam 1 and Beam 2) using a combination of complex weights ($W_{ij}$) that are applied to the digitized beam data. The weights are assumed to be complex, as provided for in the diagram by the 'Quadrature Sampling' function. These weighted channels are summed to form a set of spatial filter outputs known as "beams." The complex weight factors accomplish both phase shifting and amplitude weighting of the antenna data prior to summation.

Beamforming architectures normally encountered would typically resemble that shown in FIG. 1. Sensor elements 10 (e.g., antenna elements in the case of radar or RF communications systems) are simultaneously sampled and converted to digital form. This function is referred to as Quadrature Sampling 12. The digital form can be put into the form of In-Phase and Quadrature (I&Q) data 14, or equivalently complex samples which represent the analytic signal. Next, each channel is multiply weighted by weights ($W_{ij}$) and summed in summers 18 to form multiple beams, essentially accomplishing the matrix multiplications outline in the discussion above. In the diagram, data is multiplied by one set of weights and summed to form Beam 1, and multiplied by another set of weights and summed to form Beam 2. The numbers of sets of weighting/summation combinations is equal to the number of beams (look directions) to be formed.

The weights are complex and each complex weight multiplication can be decomposed into a real (amplitude) multiplication and a phase shift. In this form, the beamforming architecture can be made into an equivalent analog form, wherein the Quadrature Sampling can be replaced with a complex mixing (translation) plus band pass filtering, and the phase shifts could be accomplished using analog phase shifters.

In the application domain of beam formation, the Discrete Hermetic Transform (DHT) procedure described here is flexible enough to accommodate requirements for broadband operation, and/or compensation for the disruption of wave front shape due to local multipath near the receiving or transmitting array. The technique can also be made to work for essentially any array geometry, as shown below. Moreover, the final elemental beamforming operations of weighting and phase-shifting can be performed via either analog or digital means, in order to accomplish the required mathematical effects in transforming channel signal data into spatially filtered 'beam' data.

In the area of spatial beamforming, higher gain arrays are made possible while still allowing a small physical array. It is also the case, within the application domain of spectral analysis, the DHT achieves a higher frequency resolution for the same time duration of signal, allowing for the capture of non-stationary/dynamic signals, or for the increase in signal to noise ratio in narrowband signal detection. The combined operations of spatial filtering/beamforming, and spectral analysis is known as frequency-wavenumber processing, and the technique can be generalized to perform this combined type of processing as well.

The above discussion does not preclude other applications where signal phasing or resolution enhancement is important, such as coherent optical systems, coherent electron or ion microscopy, or signal storage for computers or other storage of digital or analog signal data. For example, the devices and methods can be applicable to either transmit or receive beam formation in the acoustic, radio frequency, or optical spectrum. Because of the wave/particle duality of quantum physics, the technique can also be used in electron or ion microscopy imaging and/or beam shaping. The application of this technology to the spectrum analysis and filtering of signals to the complementary Fourier transform of signals is applicable in any of the above domains, as well as to data transformations in more general applications wherever such transformation may be useful. This would include fields as far apart as medical EEG or EKG analysis, image enhancement, stock market and time series forecasting, and general pattern analysis and recognition.

Figure 2:
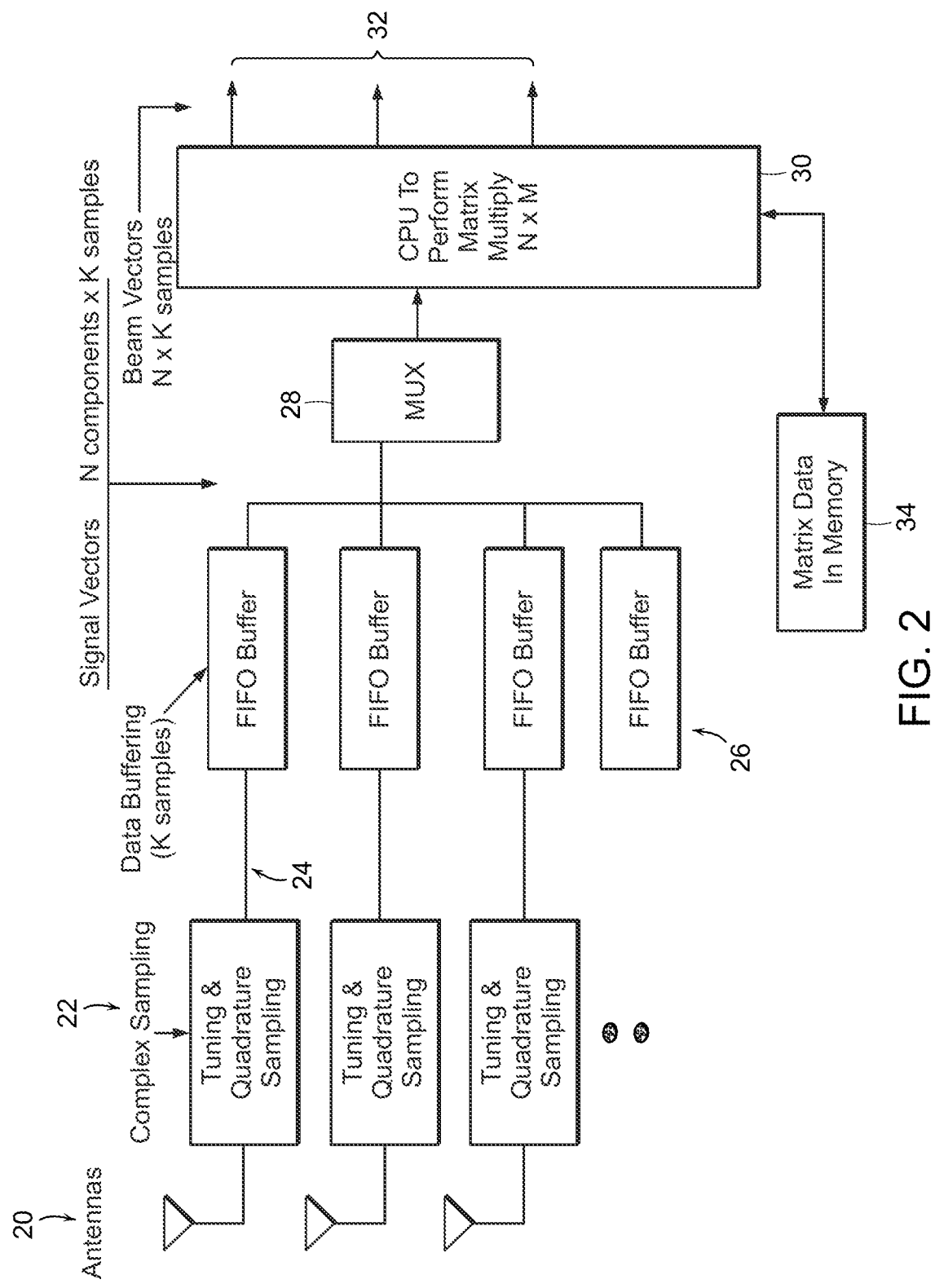
FIG. 2 is a schematic relating to the reception of signals with an antenna array.

A general diagram for a common embodiment is shown in FIG. 2. A plurality of N antennas 20 form an array of sensors, the outputs which are provided to Tuning and quadrature Sampling blocks 22 where the signals are heterodyned down to an intermediate frequency (IF) or baseband, and synchronously time-sampled in quadrature to provide N channels 24 of complex (in-phase and quadrature component) sampled data. Heterodyning can be performed using a set of phase-locked local oscillators in order to preserve phase differences between channels.

A set of FIFO buffer memories 26 stores K complex samples from each of the N channels. With time synchronization preserved, data samples from each channel are multiplexed in MUX 28 to form K, N-component, complex signal vectors ("snapshots"), size 1×N, which are subsequently processed by a processor 30. The processor can include, for example, one or more programmable Central Processing Units (CPUs) or digital logic specialized hardware processing unit(s), such as a Field Programmable Gate Array(s) (FPGA). The processor performs a complex matrix multiplication using a matrix of size N×M to create K beam output vectors 32 of size 1×M. The special data matrix which allows the creation of super-resolution properties, described in the body of this section, is stored in memory 34 for use by the processor. Alternatively the matrix multiplication can be re-arranged to perform M×N matrix multiplies on N×1 vectors to produce a set of K M×1 complex beam vectors. The complex matrix multiply is referred to here as a Discrete Hermetic Transform (DHT) in analogue to the traditional Discrete Fourier Transform (DFT).

Discrete Hermetic Transform (DHT)

Linear discrete time transforms essentially can be characterized in terms of matrix multiplications. A technical description of the DHT as applied to beamforming for a linearly arranged array of radio wave receiving elements (e.g., a linearly arranged array of antennas) illustrates an application of the technology described here to one exemplary domain, that of spatially filtering our a communications signal, arriving from a specific direction, in the presence of interfering signals arriving from other directions.

Assume elementary array geometry, a linear array with uniform spacing of d spatial units between the N elements of the array, and consider an acoustic (pressure field) plane wave of the form $$E(r,t) = Ae\cos(k \cdot r - \omega t + \phi) \qquad \text{E1.}$$

generated by a remote radio wave source, and impinging on the array, where E is the electric field, A is the wave amplitude, e is the polarization vector, k is the wave-vector having length $|k|=\omega/c$ (c being the speed of sound) and pointing in the direction of energy propagation, $\omega$ is the radian frequency=$2\pi \times$ the wave frequency in Hz, r is the physical point in space where the field value is measured, and $\phi$ is an arbitrary phase parameter of the wave.

The above expression can be re-written in the form:

$$E = Re\{Ae\exp[k \cdot r - \omega t + \phi]\} \qquad \text{E2.}$$

where E is the real part of a complex exponential. From this point forward, the wave is considered to be represented by its complex form, understanding that to get to a real physical value one takes the real part. Only the component of the field in the plane of polarization is considered (circularly polarized waves being represented by a sum of perpendicular polarized components). The reference phases are set to be zero at an arbitrary physical point (r) and reference all other phase values to it.

A set of receiving elements for the array are assumed to be located at a set of points in space, which are assumed, for convenience, to lie along the x-axis of an x/y/z three dimensional coordinate. If θ is the angle between the propagating wave-vector and the axis of the array then $$E(x_n, t) = A\exp[kx_n \sin(\theta) - \omega t] \qquad \text{E3.}$$

where $x_n$ is the x-coordinate of the nth element. Finally, an appropriate proportionally is assumed for the receiver to convert field (E) to voltage signal (V), through induced motion of charges in the conductive antenna. One can therefore write the following expression, using $x_n = n\,d$, with d being the inter-element spacing, and suppressing the time dependence, for the signal voltage from each receiving channel as follows:

$$V(n;\theta) = \exp[j2\pi n(d/\lambda)\sin(\theta)], n = 0, 1, \ldots [N-1] \qquad \text{E4.}$$

with j being the square-root of (−1), X being the wavelength of an arriving plane wave, and λ=c/f.

The array of values $V(n; \theta) = V(\theta)$ is referred to as the 'signal vector,' which is taken to be a column vector of length N elements (an N×1 matrix of complex values) and representing a set of received voltages produced by the N receiving elements in response to a pressure wave with harmonic time dependence arriving from a particular direction indicated by the arrival angle θ.

The conventional DFT type beamformer includes a matrix multiplication of the form below:

$$\Sigma(\theta_1, \theta_2, \theta_3, \ldots)U(\theta) = \beta(\theta) \qquad \text{E5.}$$

where each row of the matrix $\Sigma(\theta_1, \theta_2, \theta_3, \ldots)$ is constructed as a 'matched filter' for an arriving plane wave, as the complex conjugate transpose of a signal vector of unit amplitude assumed to be generated by a wave arriving from a given direction $(\theta_i, i=1, 2, 3 \ldots)$. $\beta(\theta)$ is the pattern response vector, also an N×1 (complex) vector. The vector $U(\theta)$ is the vector of channel voltages as described above, assumed to be generated by an arriving plane acoustic wave, from a direction of arrival that is, a priori, unknown.

Thus the matrix $\Sigma(\theta_1, \theta_2, \theta_3, \ldots)$ is of a form indicated by the equation below:

$$\Sigma(\theta_1, \theta_2, \theta_3, \ldots) = \|V(\theta_1)\ V(\theta_2)\ V(\theta_3) \ldots\|^H \qquad \text{E6.}$$

where the superscript H in Equation E6 indicates a Hermetian Transpose operation, i.e., the complex conjugate transpose of the matrix having columns that are of the form of equation E4.

In the above expression, each matched filter vector (V) is normalized with the same amplitude (A) which is arbitrary and nominally set to 1 (unity). Since each of the vectors $V(\theta_i)$ are N elements long, the dimensionality of Σ is M (rows)×N (columns) where M corresponds to the number of beams (i.e., the number of "look" or "steering" directions) and N is the number of receiving channels used to form each beam.

For the linear array geometry as described above, the matrix $\Sigma(\theta_1, \theta_2, \theta_3, \ldots)$ is explicitly given by the following expression:

$$\left\| \exp\begin{bmatrix} -j2\pi(d/\lambda) \\ \sin(\theta_1) \end{bmatrix} \ \exp\begin{bmatrix} -j2\pi 2(d/\lambda) \\ \sin(\theta_1) \end{bmatrix} \ \exp\begin{bmatrix} -j2\pi 3(d/\lambda) \\ \sin(\theta_1) \end{bmatrix} \ \ldots \right\| \qquad \text{E7}$$

$$\left\| \exp\begin{bmatrix} -j2\pi(d/\lambda) \\ \sin(\theta_2) \end{bmatrix} \ \exp\begin{bmatrix} -j2\pi 2(d/\lambda) \\ \sin(\theta_2) \end{bmatrix} \ \exp\begin{bmatrix} -j2\pi 3(d/\lambda) \\ \sin(\theta_2) \end{bmatrix} \ \ldots \right\|$$

-continued $$\left\| \exp\begin{bmatrix} -j2\pi(d/\lambda) \\ \sin(\theta_2) \end{bmatrix} \ \exp\begin{bmatrix} -j2\pi 2(d/\lambda) \\ \sin(\theta_2) \end{bmatrix} \ \exp\begin{bmatrix} -j2\pi 3(d/\lambda) \\ \sin(\theta_2) \end{bmatrix} \ \ldots \right\|$$

$$\| \quad \ldots \quad \ldots \quad \ldots \quad \ldots \|.$$

If $(d/\lambda)\sin(\theta)$ is recognized as a normalized wave number frequency (Ω) then the above matrix can be re-written as:

$$\|\exp[-j\Omega_1]\ \exp[-j(2\Omega_1)]\ \exp[-j(3\Omega_1)]\ \ldots\| \qquad \text{E8}$$

$$\|\exp[-j\Omega_2]\ \exp[-j(2\Omega_2)]\ \exp[-j(3\Omega_2)]\ \ldots\|$$

$$\| \qquad \qquad \qquad \qquad \|$$

$$\| \ \ldots \quad \ldots \quad \ldots \quad \ldots \|.$$

and the operations produced by the Matrix Multiplication results in Discrete Fourier Transform of the input vector $V=\{V_n\}$. Substituting the explicit form of the matrix into equation E5, $$\sum_n \exp[-j2\pi n\Omega_m]U_n = \beta(\theta_m). \qquad \text{E9}$$

where the sum runs over the index n, i.e., over the component receiver channels, and the index m indicates the different wave-number frequencies, arranged according to the rows of the matrix, and given by the following equation:

$$\Omega_m = 2\pi(d/\lambda)\sin(\theta_m) \qquad \text{E10.}$$

From the above expression, one can see that the expression for the beam response $\beta(\theta_m)$ is in the form of the Discrete Fourier Transform (DFT) of the vector U, according to the normal conventional definition. See, e.g., Gabel and Roberts, "Signals and Linear Systems", 2nd Edition, John Wiley & Sons, New York, 1980 (see esp. Equation 5.181 on page 345 for a conventional definition of the DFT).

The DFT of a discrete sequence or function f(n) is defined here, according to the expression below:

$$F(\Omega) = \sum_{n=0}^{N-1} f(n)\exp[j\Omega n]. \qquad \text{E11}$$

where $F(\Omega)$ is the DFT evaluated at frequency Ω.

The expression of equation E5 can also be interpreted as the projection of the complex vector U onto a set of complex basis vectors e(θ) which are the rows of the matrix $\Sigma(\theta_1, \theta_2, \theta_3, \ldots)$.

As discussed above, it is often the case that the channel data ($U_n$) are multiplied by a weight function w(n), to produce beams that have low side lobe response away from the main lobe/axis of the beam formed. In this case equation E11 becomes:

$$F(\Omega) = \sum_{n=0}^{N-1} w(n) * f(n)\exp[j\Omega n]. \qquad \text{E12}$$

This operation can be introduced in equation E5 through the pre-multiplication of U with a diagonal matrix W (a matrix with values of zero outside the main diagonal), the elements of which are w(n):

$$\Sigma(\theta_1, \theta_2, \theta_3, \ldots) W^* U(\theta) = \beta(\theta) \quad \text{E13.}$$

Narrowing of the main lobe in beamforming may also be accomplished through the introduction of special weights, as is previously known. In this case, the above form of equation E13 still applies, with w(n) equal to the so-called super gain weights.

The expression of equation E13 can be generalized to the case where the matrix W is a non-diagonal matrix, and in fact can be designed with particular properties so as to improve beam directivity, especially in the case of arrays which are sampled at less than half-wavelength spacings. For the case where M is much greater than N, least squares techniques can be applied to solve for a matrix W which makes the beam response $\beta(\theta)$ as close as possible to a reference vector $\rho(\theta)$ in a least squares sense.

In one embodiment, the following procedure is applied. First, for each of the chosen beam directions $\{\theta_1, \theta_2, \theta_3, \ldots\}$, a reference vector $\rho(\theta_m)$ (a vector of have dimensions N×1) is chosen to have zeroes in all rows, except for the row corresponding to the one selected beam direction, $\theta_m$, in which row is placed the value "1" (unity). The reference vector $\rho(\theta_m)$ essentially represents an "ideal" beam response, with response only in the desired direction, $\theta_m$, and zero response elsewhere. The following least-squares problem is then solved to determine the matrix W:

$$\Sigma(\theta_1, \theta_2, \theta_3, \ldots) W^* V(\theta_m) = \rho(\theta_m) \quad \text{E14.}$$

to create a matrix that produces a beam response $\{\beta(\theta)\}$ that is as close as possible to the desired beam response $\rho(\theta_m)$ in a least-squares sense.

The least-squares solution to the above problem is directly solved for yielding:

$$W = \{\Sigma^H \Sigma\}^{-1} \Sigma^H \rho(\theta_m) [V(\theta_m)]^H \{[V(\theta_m)] V(\theta_m)]^H\}^{-1} \quad \text{E15.}$$

where the H superscript indicates the Hermitian or complex conjugate transpose, and the (−1) superscript indicates the matrix inverse of a square matrix.

The matrix $\Sigma$ is an (M×N) matrix, with V and $\rho$ are (N×1) matrices. The matrix W is an (N×N) matrix. Because the square matrices being inverted may have less than full rank, for purposes of practical computation, the full matrix inverse is replaced by the pseudo-inverse (−1 goes to #).

$$W = \{(\Sigma^H \Sigma)^\# \Sigma^H\} \rho(\theta_m) [V(\theta_m)]^H \{[V(\theta_m)] V(\theta_m)]^H\}^\# \quad \text{E16.}$$

Next, using matrix W as obtained above, for each of the beam directions, a new beamforming matrix (H) is created to replace $\Sigma$ by replacing the $\theta_m$ row of $\Sigma$ with the row vector $$h(\theta_m) = [V(\theta_m)]^H W(\theta_m) \quad \text{E17.}$$

where $W(\theta_m)$ is the solution (W) to equation E16 for the beam steering direction $\theta_m$.

Next, the matrix $\Sigma$ in equation E5 (the fundamental beamforming equation) is now replaced by the matrix H, termed here the Hermetic Matrix, where H is given by $$H_{(\theta_1, \theta_2, \theta_3, \ldots)} = \sum * w = \begin{Vmatrix} \|h(\theta_1)\| \\ \|h(\theta_2)\| \\ \|h(\theta_3)\| \\ \| \ldots \| \end{Vmatrix} \quad \text{E18}$$

The Fourier Basis Functions (rows of the $\Sigma$ matrix) of equation E5 have now been replaced with a different set of basis functions which have useful properties, i.e., they produce a set of beams which are as close as possible to a set of reference beams (such as the "ideal" beams described above), in a least-squares sense. The matrix rows are normally scaled for numerical reasons, e.g., to produce a peak response of unity when a steering vector of unity amplitude is presented.

The new beamforming equation that replaces equation E5 above is therefore the following:

$$H(\theta_1, \theta_2, \theta_3, \ldots) = U(\theta) = \beta(\theta) \quad \text{E19.}$$

Instead of a beamforming method based on Discrete Fourier Transforms, the present method is based on what is termed here a Discrete Hermetic Transform, wherein the unknown channel data is pre-multiplied by the Hermetic Matrix (H) to produce the beam response vector $\beta(\theta)$, according to equation E19.

Applications that employ the conventional DFT (or FFT or Butler Matrix) types of beamforming (or time-delay/sum equivalents) can be made to use a DHT procedure substantially equivalent to that described above.

Other optimization procedures may be envisioned, for example the backpropagation algorithm used in neural network processing, as well as stepwise recursive implementations of least-squares, such as the Kalman filter. While the above treatment is static, i.e. the desired beam shape is known and the Hermetic Transform Matrix pre-determined, adaptive reference generation, for example, to accomplish null steering dynamically, can also be implemented.

Although the generalizations are described in terms of beamforming and arrays, they can apply to other domains, such as the time-frequency analysis of signals performed to determine the signal spectrum, or to encode information for transmission or storage in communications or computer systems.

Multi-Dimensional Data/Arrays

This procedure can be generalized to the case of multi-dimensional data/arrays. First, in the ideal case of plane wave beamforming, the matched filter vector for a given row of the initial beamforming matrix (i.e. the steering vector $V^H$) is set to the following:

$$V[n;k(m)] = \{\exp[-jk \cdot r_n]\} \quad \text{E20.}$$

where there are N elements, indexed by n, and m beam-steer directions with incoming wave-vectors k(m).

Data from particular element locations in a planar or volumetric array (e.g. indexed by row and column in the case of a planar, rectangular array) is mapped through a consistent bi-directional indexing scheme, into a single column data vector with a single component index (n). Similarly, beam steering directions (e.g. in azimuth and elevation) are re-indexed into a single component output vector with a single component index (m). The prior (HOP) technique for one-dimensional arrays is then applied as described above.

Synthetically Constructed Interpolated Arrays (SCIA's)

Because of the Nyquist Sampling Theorem, a band-limited signal which is sampled with intervals no larger than the Nyquist rate, can be represented by, and recovered from, a set of discrete samples that meet the Nyquist sampling criteria. See, e.g., Gabel and Roberts, Chapter 5.12, pages 327-332. According to the Nyquist Sampling Theorem, the minimum sampling frequency (Nyquist Rate) is no higher than twice the highest frequency present, and can be as low as twice the bandwidth of the signal (or the bandwidth of the signal in the case of a complex, analytic representation). This suggests that the oversampling used to increase the resolution of beams or frequency bins via DHT may be generated through up-sampling, i.e., through the interpolation of data which is already sampled at a rate that is higher than Nyquist. This is a useful result, as the number of physical channels needed can potentially be much smaller than the number of data channels needed in the beam forming matrix in order to produce highly directive beams. The above concept is referred to here as that of a Synthetically Constructed Interpolated Array (SCIA). The SCIA can be constructed and the DFT method applied to the data with some minor modifications. Specifically, as applied to SCIA, the exact matched filter steering vector (V) utilized in the beamforming matrix $\Sigma(\theta_1, \theta_2, \theta_3, \ldots)$ as described above, is replaced with the interpolated (matched filter) steering vector. All other aspects of the HOP remain the same. This approach allows the least-squares procedure to compensate for any interpolation errors due to numerical interpolation filtering. Interpolation of complex data is done in the polar domain, interpolating magnitude and interpolating phase of the complex vectors.

Doblinger (cited above) shows that interpolated conventional arrays can produce lower sidelobes through the creation of "virtual" elements. Similar benefits from SCIA interpolation, in terms of mainlobe sharpening, can occur when combined with the Hermetic Transform processing.

Beamforming with Multipath

A common problem in radar and communications antenna processing is the corruption and distortion of the arriving wavefront via local reflections and multipath propagation/scattering. In this case, the above procedure is modified by replacement of the steering vectors rows ($V^*(\theta_m)$) of the beamforming matrix $\Sigma(\theta_1, \theta_2, \theta_3, \ldots)$ with calibration vectors, that are either data actually observed from the arrivals the chosen steer angles ($\theta_1, \theta_2, \theta_3, \ldots$), or are derived from accurate physical models which include the local scattering.

Hybrid Procedure

In the above formulation, the step outlined in equation E17:

$$h(\theta_m) = [V(\theta_m)]^H W(\theta_m) \quad \quad \text{E21}$$

can be modified to add to the matrix $W(\theta_m)$ of equation E16, a diagonal matrix which contains a conventional array weighting function f(n), i.e., the components of W are modified as follows:

$$W_{nm} >> W_{nm} + f(n)\delta_{nm} \quad \quad \text{E22}$$

where $\delta_{nm}$ is the kronecker delta, defined to be unity when n=m, and zero otherwise. This hybrid procedure produces a beam shape which is intermediate between the full procedure and that of the conventional approach.

The above generalizations can be summarized as follows:
(1) the methods can be used with multi-dimensional data, such as with data from planar or volumetric arrays;
(2) the methods can be used on Synthetically Constructed Interpolated Arrays, obtained by interpolation of data from physical elements;
(3) the methods can be used in the presence of, and specifically to mitigate the effects of, multipath which corrupts and distorts the signal wavefronts; and
(4) Hybrid DHT/conventional approaches can be formulated and applied as well.

In addition, use of non-planar wavefront matched filters would allow the systems and methods here to be used to develop beams focused at particular points in space.

Broadband Application

There are several ways to apply the above technique to broadband signals:
(1) the signals can be processed by a narrowband transform, e.g., DFT/FFT, or as seen below by DHT, and frequency dependent matrices used to process transform 'bins';
(2) the row vectors of the Beam Forming Matrix H (vector used to form a beam in a given direction) can be characterized so that the magnitude and phase shift applied by each row component can be applied by a digital filter, this mapping being accomplished using standard digital filter design techniques offline;
(3) the procedure outlined above for design of the matrix W can be modified as follows: (a) the $\Sigma$ matrix is chosen to correspond to the middle of a frequency band of interest, (b) the vector V is replaced with a matrix with column vectors corresponding to V vectors at a number of selected frequencies in the band of interest, and (c) the response vector p is replaced with a matrix, the columns of which is the desired or ideal response at the selected frequencies. The matrix W developed for each beam steer direction is then the best single least-squares form for the selected band of interest.

Decomposable Architecture

Figure 3:
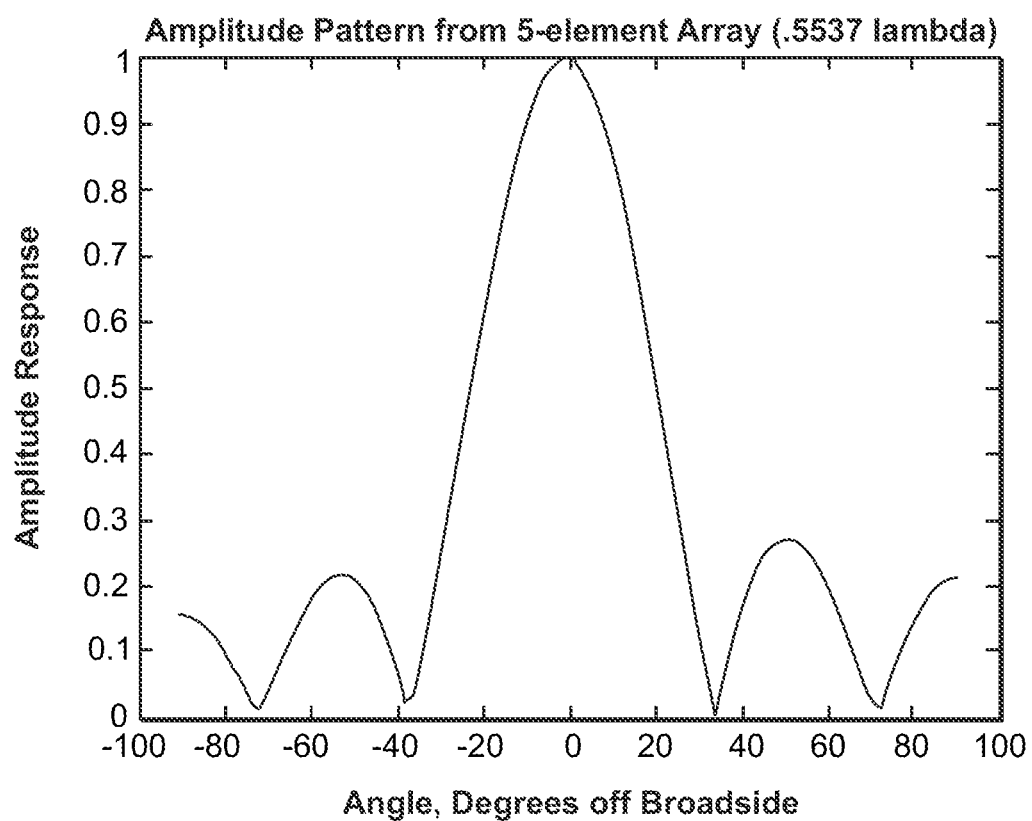
FIG. 3 is a graph showing an amplitude response from a five-element array according to one embodiment.

The Hermetic Matrix H is formed as the product of a normal beamforming matrix part and another matrix W, which substitutes for the normal weighting used in conventional phased array beamforming to control sidelobes. When decomposed in this form, the present system and method effectively adds a pre-processing step to a conventional beamforming system. The Hermetic Beamformer architecture can thus be separated into a conventional beamformer, preceded by an antenna preprocessor which performs a matrix multiplication of W as specified above, times the individual antenna element time series data. Often this matrix is can be approximated well by a real-valued matrix; for example, the matrix below was developed using a version of HOP for a 5-element linear array with total array length 0.5537$\lambda$. The amplitude response created for a beam steered broadside, after the elements have been pre-processed with the W matrix below, $$\begin{vmatrix} 0.0487 & -0.1558 & 0.2150 & -0.1491 & 0.0442 \\ -0.1558 & 0.5070 & -0.7085 & 0.4971 & -0.1491 \\ 0.2150 & -0.7085 & 1.0000 & -0.7085 & 0.2150 \\ -0.1491 & 0.4971 & -0.7085 & 0.5070 & -0.1558 \\ 0.0442 & -0.1491 & 0.2150 & -0.1558 & 0.0487 \end{vmatrix}$$

is shown in FIG. 3.

The beam pattern shown here is approximately 36° wide vs. the approximately 120° wide pattern expected with conventional array beam forming.

Figure 4:
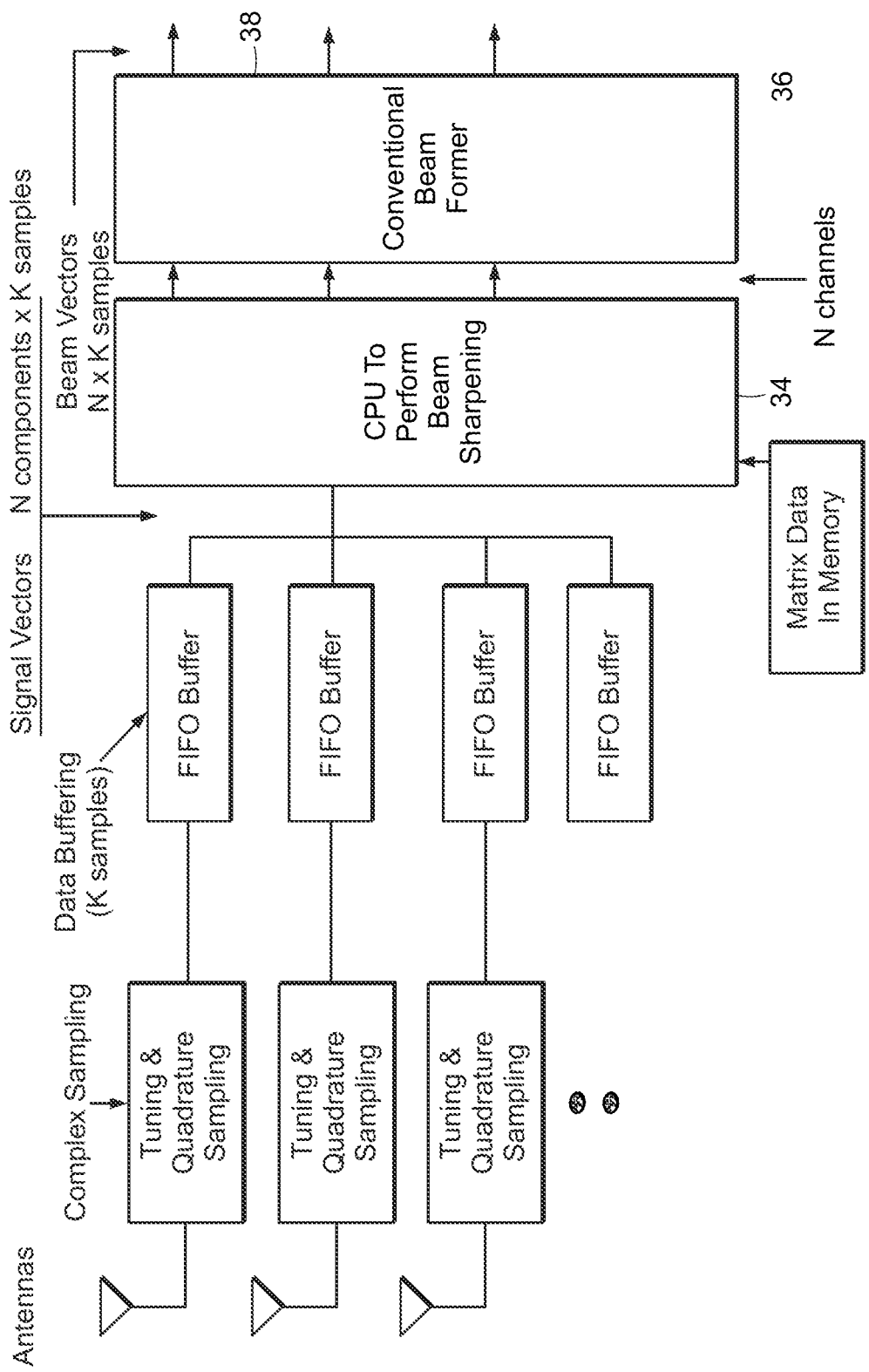
FIG. 4 is a schematic of an alternative implementation on the receiving side.

Referring to FIG. 4, a diagram of the separable architecture is shown generally similar to FIG. 2 but with two stages of processing: CPU 34 with an N×N matrix multiply to create N channels 36 of "sharpened" data channels, and an M×N matrix multiply (equivalent), or conventional beamforming network/processing stage 38.

Useful Results and Applications of the Invention

A number of useful results can be obtained by applying the above procedure to some common problems in beamforming and to spectrum analysis. Other evident and useful applications can also be readily seen and described.

Beamforming with Physically Small Arrays

Figure 5:
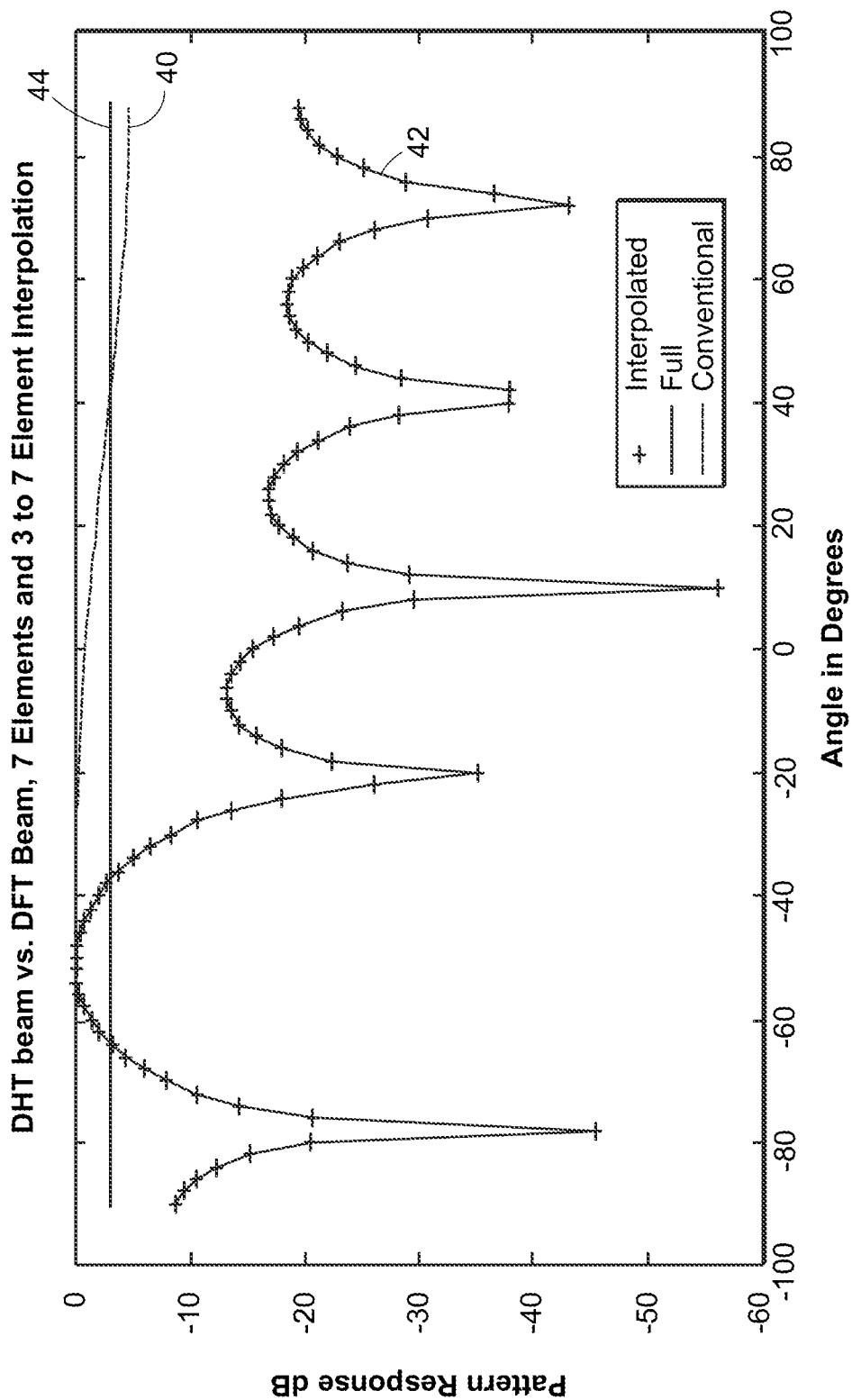
FIGS. 5-10 are graphs demonstrating features of embodiments described therein.

FIG. 5 shows results of beamforming a 2/10 wavelength (total length) linear array. The results plotted are pattern response vs. angle, in decibels (dB) with the peak of the response normalized to one (unity).

The results of conventional beamforming using DFT beamforming and uniform weighting on a 7-element array (seven physical receive channels) is shown by line 40 at the top. The resulting pattern developed for the same 7-element linear array using the DHT with Hermetic Matrix derived from equation E16 is indicated by curve 42. A peak of the DHT pattern is correctly located at the true beam arrival angle. The '+' points indicate by comparison, the result of creating a 7-element Synthetically Constructed Interpolated Array (SCIA) from only three physical elements that span the $^2/_{10}$ wavelength array (i.e., equal $^1/_{10}$ wavelength spacing). These patterns serve to illustrate the utility of the systems and methods with regards to the increased resolution properties.

The same plot under discussion shows the 3-dB down point as a black line 44, so that pattern main lobe widths can be compared. The pattern derived is seen to be on the order of 20° wide whereas the pattern from the conventional (DFT) approach is nearly omni-directional. With conventional beam forming approaches, the array would have to be on the order of 3-wavelengths to obtain a 20° wide beam, or 15 times as long as the array being considered here. In addition, the ability to utilize a small number of physical elements results in a reduced hardware complexity of the array, a reduced number of data acquisition channels, etc.

Similar advantages can be obtained for multi-dimensional arrays and arrays of other geometries than linear/planar.

Figure 6:
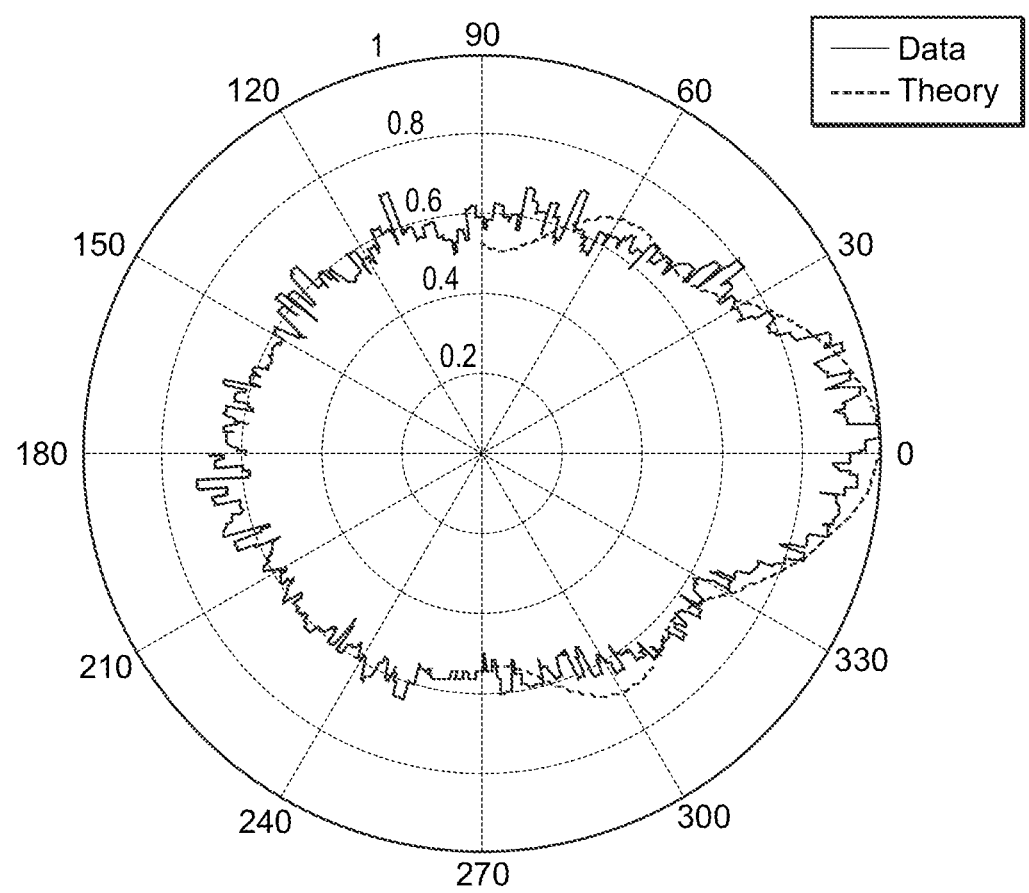

FIG. 6 shows raw amplitude azimuthal beam pattern data and a corresponding theoretical prediction (model) for conventional phased-array beamforming of a cylindrical array using 5 elements arranged on a half-face.

Figure 7:
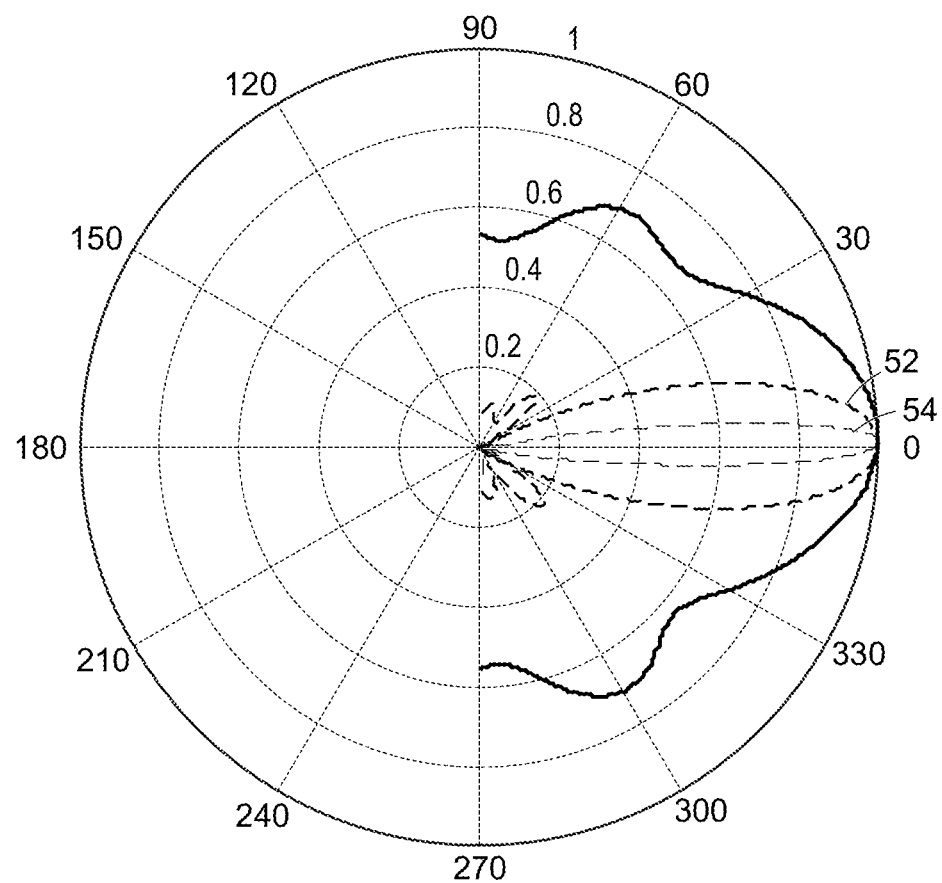

FIG. 7 shows three beam amplitude patterns, corresponding to the same cylindrically shaped array. The outer pattern (DHT-5 Staves) shown as line 50 is the same predicted pattern shown in FIG. 6 using conventional beamforming and uniform weights. The next pattern shown with line 52 is obtained by applying the present invention to the beamforming of the same data from the 5-stave used to form the conventional beam. The sharpest pattern shown with line 54 is formed with a SCIA, interpolating the 5-stave data up to 19 total receiving channels using interpolation then applying the method described herein to form the beam. The results show a significant increase in beam resolution.

Two Dimensional Arrays

Two dimensional DHT processing can be used to form beams from two-dimensional arrays, or to perform beamforming and spectrum analysis simultaneously (frequency-wavenumber spectral analysis).

Figure 8:
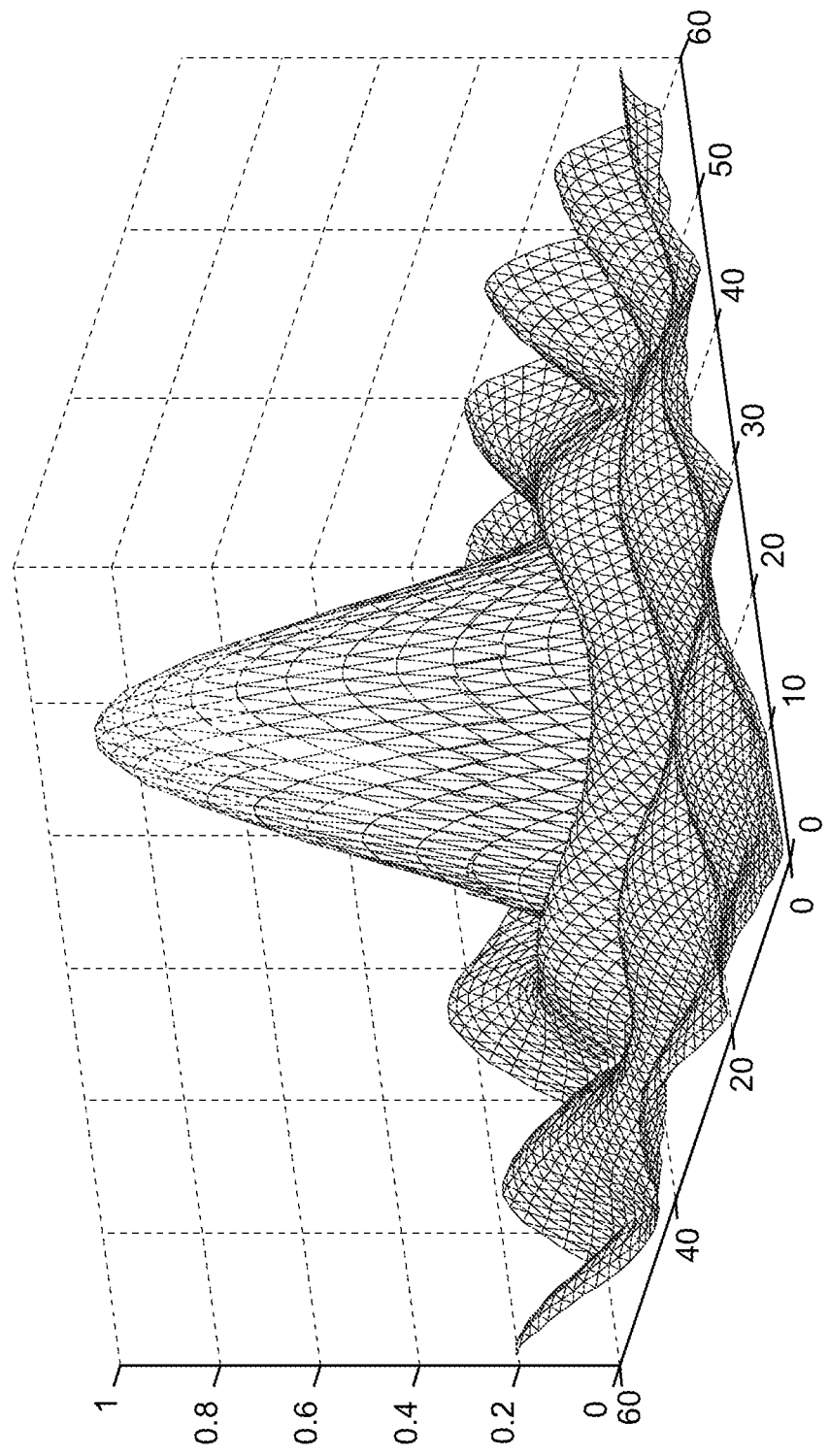

A two-dimensional planar array example corresponding to the above linear array example illustrates the applicability and utility of the present invention for the multi-dimensional case. FIG. 8 depicts the two-dimensional beam pattern amplitude for the case where a 7×7 array with $^1/_{28}\lambda$ spacing between elements has been beam-formed with 60 elevation and 60 azimuthal steering directions over an entire half-plane faced by the array. The pattern response to an arriving plane wave is shown in FIG. 8, with amplitude shown on the z axis and angle shown as angle index (approximately 3 degrees per index step). The beam width observed is clearly far superior to that of a conventionally beam-formed array of the same dimensions, which would be essentially omnidirectional in its response.

Spectrum Analysis using DHT

A conventional method of performing spectrum analysis is through the Discrete Fourier Transform (DFT), usually through a Fast-Fourier Transform (FFT) implementation of the DFT. The present methods and systems can be utilized for frequency spectrum analysis directly through the application of the Hermetic Matrix and the Discrete Hermetic Transform (DHT). In this case, the discrete-time signal can oversampled at the Analog-to-Digital Conversion (ADC) stage, or is upsampled via interpolation filtering.

Figure 9:
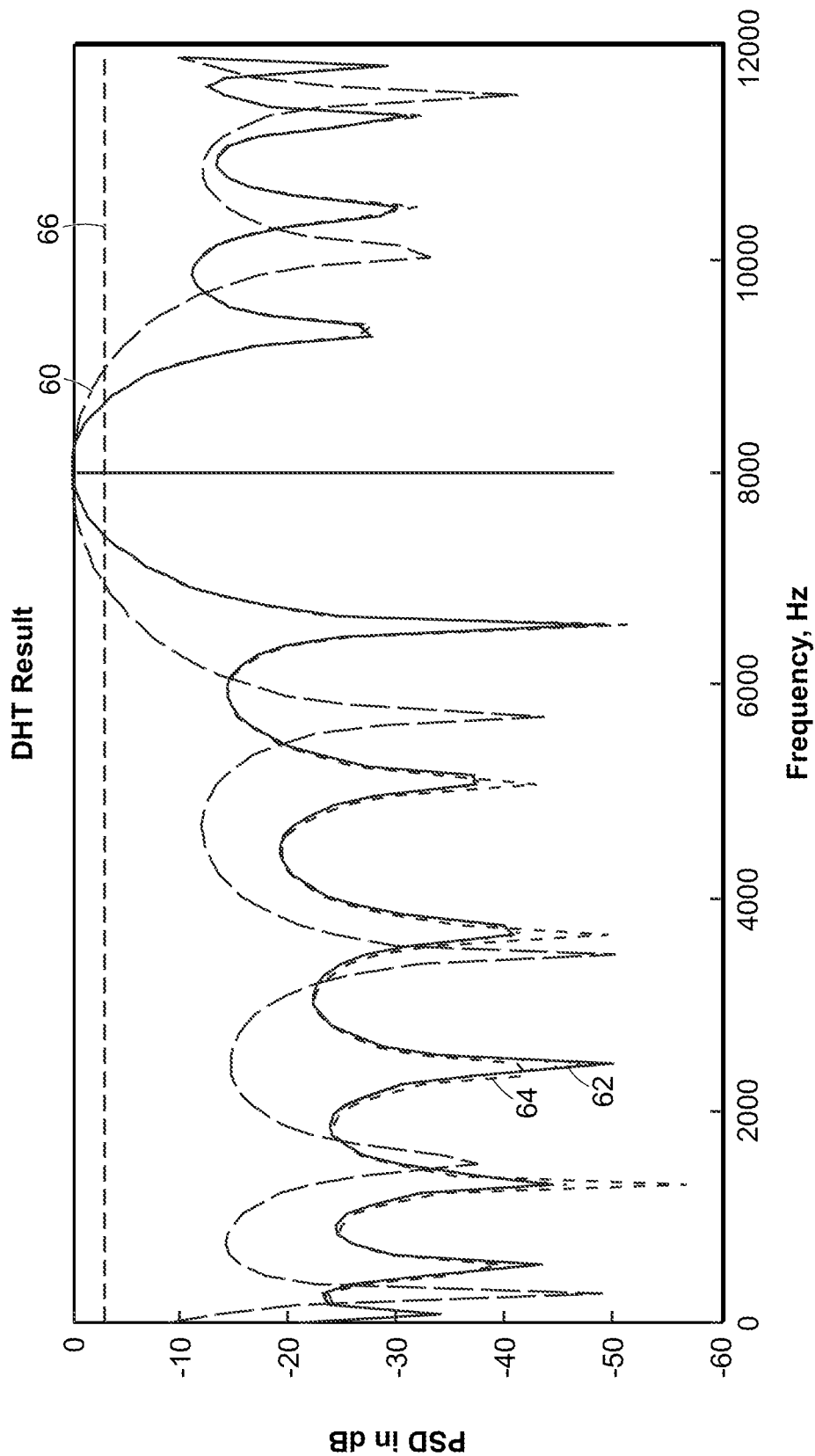

FIG. 9 illustrates the effect of applying various sample rates to the DHT of an 8 MHz sinusoidal (CW) signal that is 0.1 msec in duration, with results shown terms of the square of the transform values converted to dB.

In conventional DFT/FFT spectrum analysis, when a signal is T seconds long, the frequency resolution resulting from application of the transformation is (1/T) Hz in the frequency domain. Thus the expected frequency resolution on this signal segment is expected to be on the order of 10 MHz.

The dashed line 60 in FIG. 9 is the result of applying the DHT to the signal segment using 2× Nyquist rate. Two darker curves 62 and 64 (that largely overlap) are shown representing a 16× Nyquist sample/sec rate, and another curve being intermediate between the above two values. As sampling rate is increased, the resolution eventually converges to a minimum value. The flat line 66 shows the −3 dB down point relative to the maximum point of the frequency response, and the resolution is on the order of 1250 Mz wide vs. the expected 10,000 MHz resolution. In terms of signal to noise ratio, when using the DHT for detection, the approximately 8:1 resolution/bandwidth improvement is expected to produce a $10 \log_{10}(8)$ or about 9 dB improvement in signal to noise ratio.

Figure 10:
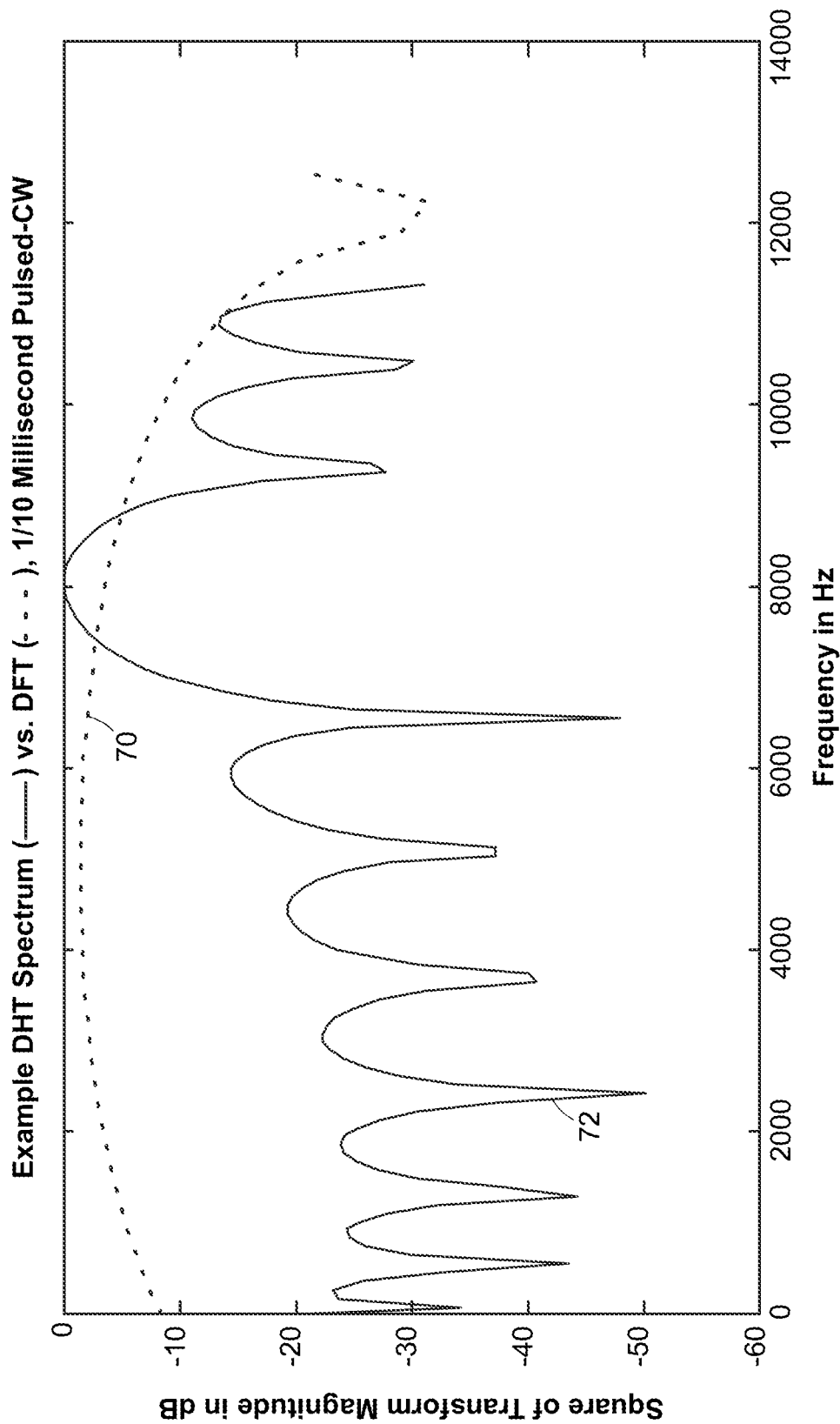

FIG. 10 shows a direct comparison of the results obtained via DFT/FFT for the same example, as compared to the convergent DHT result shown above. The top curve 70 shows the square of the Discrete Fourier Transform Magnitude output (periodogram) converted to dB, while the lower curve 72 with a series of peaks shows square of the DHT magnitude spectrum also in dB, both for same case of a 0.1 msec microsecond duration, 8 MHz sinusoidal (CW) signal. As expected, the resolution of the DFT/FFT is approximately 10 MHz.

Noise

Use of the Hermetic Transform as described above allows the creation of narrow receiving beams with a multi-element sensor array, where the sensor can include antennas, microphones, geophones, etc. Data is captured from a set of elements. In one embodiment and as shown in FIG. 2, the data is captured digitally at the output of synchronously sampled Analog to Digital Converters (ADCs), and converted to quadrature sampled (complex) data on a per channel/sensor basis. The data is then bandpass filtered (or narrow-banded, e.g., using an FFT) and a Hermetic Transform is applied to the bandpass channel(s) to produce a set of beams, spatially filtering and channelizing incoming signals impinging on the array according to their direction of arrival (DOA). The Hermetic Transform H is in general a complex-valued matrix of dimension M (number of beams)×N (number of sampled sensor elements) and has the general form $$H = \Sigma^H W \qquad \text{E23}$$

where the Σ matrix has a set of columns, each column being made up of a set of complex phasors which are in effect a spatial matched filter to the an incoming signal from a specified beam direction, $\Sigma^H$ is the Hermetian Conjugate (complex conjugate transpose) of the E matrix, and W is in general a full-rank (N×N) complex valued matrix which performs beam sharpening to fulfill the minimization of an objective function which is preset in the design of the transform. In one embodiment, the solution for W is found by solving in a least-squares sense, the following equation:

$$\Sigma^H W \Sigma = CI \qquad \text{E24}$$

where C is a scaling constant and I is the identity matrix (M×M). The transformation of a snapshot (time-sampled data from N elements) into beams is then just accomplished using the Hermetic Transform in the form of a matrix multiplication, i.e.

$$B = Hs \qquad \text{E25}$$

where B is the a set of vector of time series from the M beams, H is the Hermetic Transform matrix as indicated above, and s is a vector of time series from each of the sensor elements.

It is found empirically that the above approach in finding W can be unsatisfactory with respect to its sensitivity to noise in the sensor data, as it can be with known Super-Gain or Super-Directive beam-formed arrays.

This effect can be mitigated by placing an additional matrix between the data vector s and the Hermetic Transform H in order to better condition the data and ensure good performance of the beamformer in dealing with noisy signals.

The new equation replacing the algorithm of equation E25 has the following form:

$$B = HNs \quad\quad E26$$

with the matrix HN being referred to as a noise-compensated Hermetic Transform. In one embodiment, a solution for N is found by first generating a matrix Z of the same dimension as the matrix $\Sigma$, but including noise of a particular character, for example with elements that are complex white Gaussian noise distribution; the matrix Z can be used to solve for N in a least-squares sense with the equation shown below:

$$N(Z+\Sigma) = \Sigma$$

The form of this equation can be made more general, with the expression, $$N[(Z_1+\Sigma)(Z_2+\Sigma)\ldots] = [\Sigma\Sigma\ldots]$$

with the various $Z_i$ being different noise realizations generated numerically using a pseudo-random number generator. The equals sign in equations (4) and (5) does not mean to indicate actual equality, but instead indicates the equation to be solved in a least-squares sense.

Interpolation

In the hermetic transform approach to beam formation of spectrum analysis, the signal is over-sampled, with elements less than 1/1, spacing in the case of beam forming, or with sampling rates much faster than the Nyquist rate in the case of time or frequency domain processing. It is often a real-world constraint that the number of physical antenna elements and associated ADC channels (in the case of beam forming) or the sampling rate (in the case of time and frequency processing) are limited.

Therefore an interpolation process can be added to the Hermetic Transform processing system to create signals synthetically which "fill-in" missing data using a smaller number of elements or samples.

Figure 11:
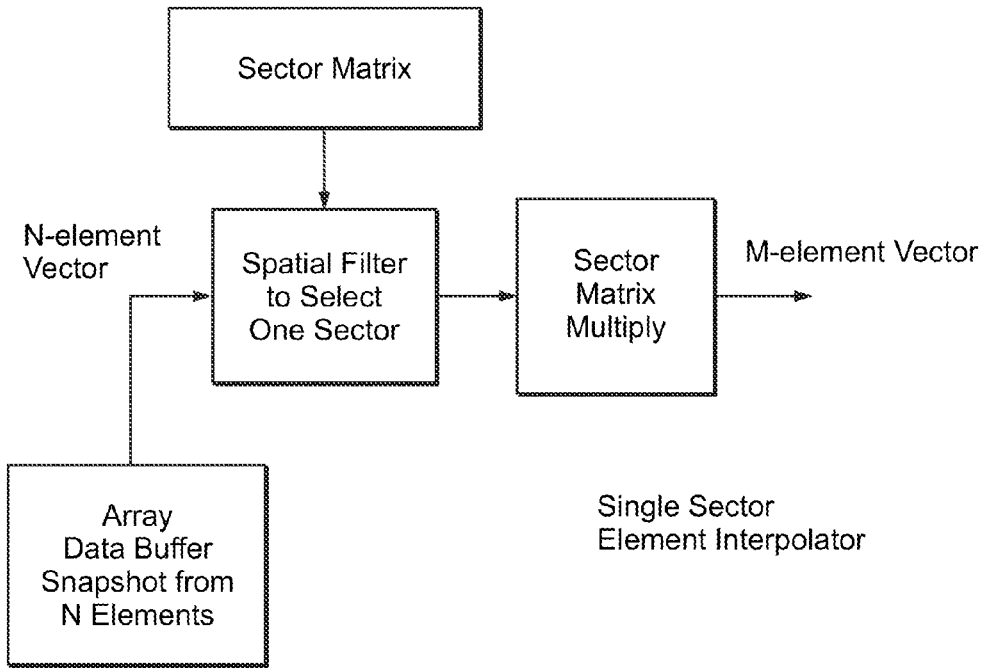
FIGS. 11-13 are block diagrams of interpolators.

FIG. 11 indicates the general structure of a spatially interpolating beamformer.

First, data from N antenna elements is buffered into N-element vectors of complex (I&Q) data. Next, N×N complex-valued matrices which comprise spatial filters for a set of directional sectors (on the order of 5 sectors to cover 180°) are applied to the data to filter out only arrivals from each sector. The filters can utilize N-element Hermetic Transforms. Next, optimal interpolation matrices are applied to produce the signal which is as close as possible according to a particular selected objective (cost) function, to the signal which would have been captured at m elements (m>N) which span the same physical space occupied by the N element array. Typically, a Least-Squares type cost function is utilized in practice. Each interpolation function is itself constructed using an equation of the type $$MS_o = S_i$$

where the matrix M is the (m×N dimensioned) interpolation matrix to be solved for, $S_o$ is has a set of N×1 column vectors corresponding to element data at the original sampling rate from specific arrival angles within the sector in question, post-filtering, and $S_i$ is the theoretically derived set of m×1 column vectors corresponding to the ideal element data at the new (higher sampling rate) spacing. For the least-squares objective function (least-squares minimization) a solution for M is given by the following equation:

$$M = S_o^H [S_i S_o^H]^\#$$

where the superscript H indicates the complex conjugate transpose (Hermitian conjugate) operation and the # symbol indicates the pseudo-inverse operation.

In an actual interpolator, the pre-stored matrixes to perform sector filtering are applied, followed by the interpolating matrices; these can be combined into a single matrix for each sector. The output M×1 data vectors from all sectors can then be vector added (summed together by components) and the result provided to a Hermetic Transform to provide the beamforming.

The features of filtering spatially, followed by interpolating spatially, can be broken into steps which can produce superior results to a single step process. For example, in going from a 3-element antenna array to an array which is synthetically generated to have the equivalent of 31 elements, one could be prudent to break this into stages, for example spatially filtering into 3-5 sectors, interpolating each of these into 13 elements, summing, filtering the output of this array into 6-10 sectors, and interpolating the subsequent filtered "arrays" up to 31 elements and summing to combine the 6-10 independent results. In practical terms all of the summing and multiplication of matrices can be normally combined into one single interpolation matrix but the design of this one matrix involves the design of a set of stages.

Figure 12:
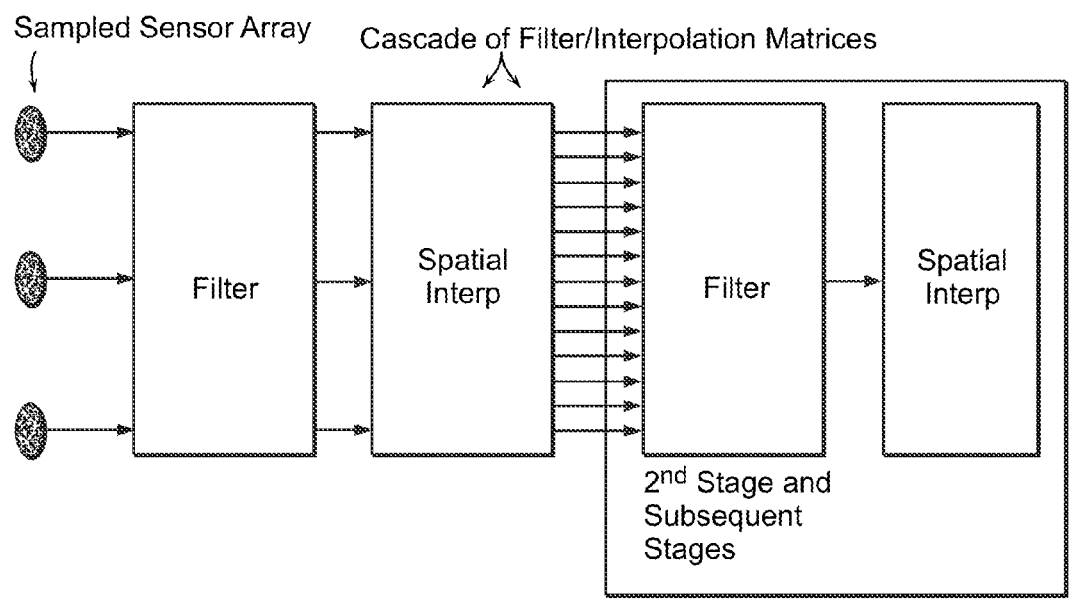

FIG. 12 indicates an exemplary architecture of this approach with a cascade of filter/interpolation matrices. Results can be superior because resolution of the beam formation process improves at each stage, and subsequent stages of filtering result in improved separation of spatial regions, so that optimal interpolators can be applied in narrower sectors, thereby reducing the interpolation error power.

Interferometric Hermetic Beam Forming and Direction Finding

A beamforming device and method is described based on a Hermetic Transform derived from calibration data including signal arrivals at particular frequencies, rather than calculated/modeled signal arrivals. The array can have arbitrary geometry. The beams can be used to accomplish direction finding. The signals can work with any types of waves, for example, radio frequency or acoustic.

As described above, the Hermetic Transform H is in general a complex-valued matrix of dimension M (number of beams)×N (number of sampled sensor elements) and has the general form $$H = \Sigma^H W$$

where the $\Sigma$ matrix has a set of columns, each column being made up of a set of complex phasors which are in effect a spatial matched filter to the an incoming signal from a specified beam direction, $\Sigma^H$ is the Hermitian Conjugate (complex conjugate transpose) of the $\Sigma$ matrix, and W is in general a full-rank (N×N) complex valued matrix which performs beam sharpening to fulfill the minimization of an objective function which is preset in the design of the transform. In one embodiment, the solution for W is found by solving in a least-squares sense, the following equation:

$$\Sigma^H W \Sigma = CI$$

where C is a scaling constant and I is the identity matrix (M×M). The equation for I is $$I_{km} = \delta(k,m)$$

where δ is the Kronecker delta function, essentially corresponding to an ideal beam response for each reference; i.e., the goal for a particular beam is to give a unit response in a particular reference direction and zero otherwise. In the general case the identity matrix can be replaced with whatever reference response is desired, such functions that approach a delta function. Zeroes can be placed in these references to compel nulling in particular directions, as another example of a particular embodiment.

The transformation of a snapshot (time-sampled data from N elements) into beams can be accomplished using the Hermetic Transform in the form of a Matrix Multiplication, i.e.

$$B = Hs$$

where B is the a set of vector of time series from the M beams, H is the Hermetic Transform matrix as indicated above, and s is a vector of time series from each of the sensor elements.

Figure 13:
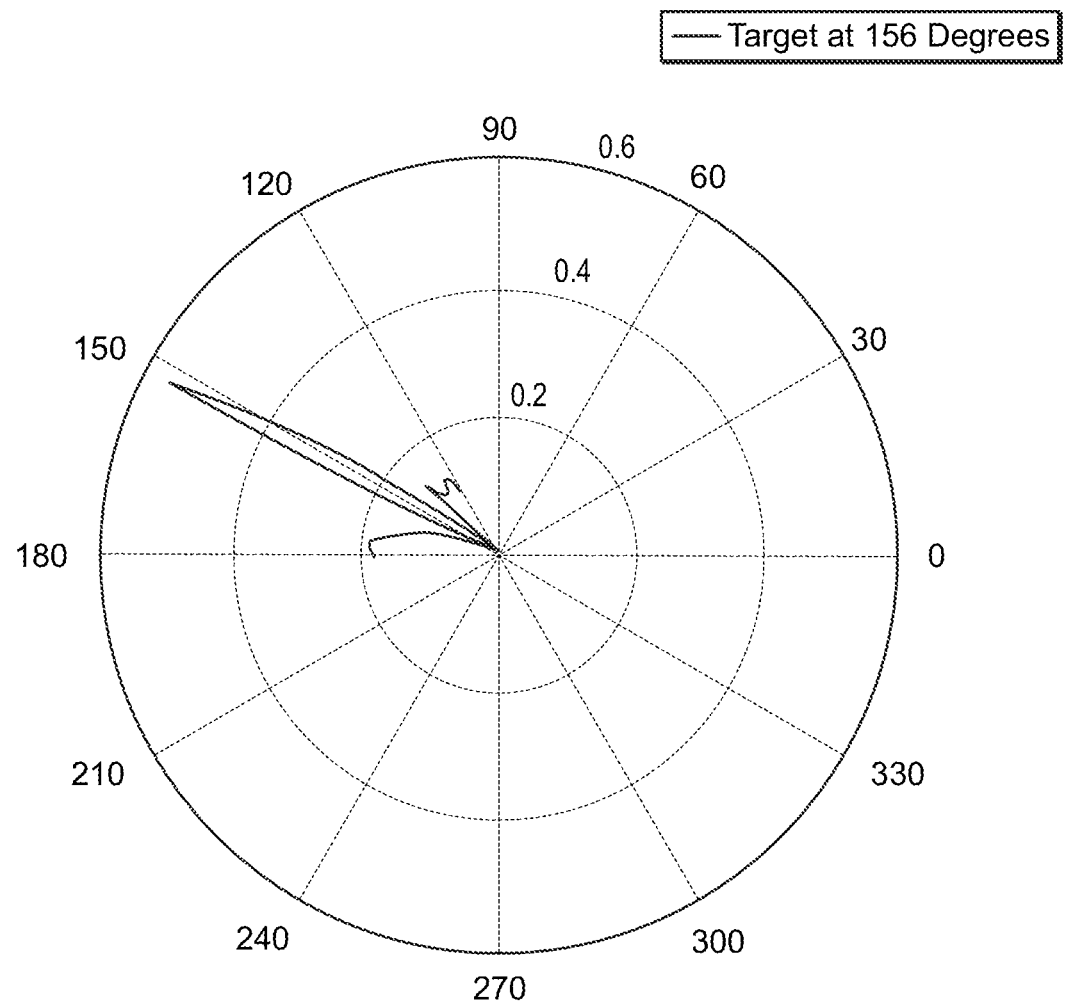

In the above treatment, the signal reference matrix Σ can be derived from mathematical analysis, simulation, or modeling of the array in question. In one embodiment, a signal reference matrix is obtained by actual measurement of signal arrivals at the sensors (antenna elements) at a set of frequencies for a set of directions around 360° azimuth and where elevation angles. The above equations still hold. The performance in beam reduction can be greatly improved when an antenna is placed in a complex scattering environment, for example on an airplane fuselage or in a cell base station location in an urban area, because of the complexity of the basis functions where signal arrivals having a great deal of multipath interference. In empirical data collections, an additional three to five fold beam width reduction has been observed. FIG. 13 below shows an actual beam constructed from a set of measured arrivals using a 4-element antenna. The array size is less than ⅓ wavelength in diameter.

The multipath actually helps improve in this case and the beamforming approach that results is actually based on a form of interferometry.

One additional feature of this approach, termed here "Interferometric Hermetic Beamforming," is that the beams generated are sufficiently narrow that they can be used for Direction Finding (DF). Either the peak response or the first moment of the beam power response (the latter corresponding to the wavenumber power spectral density) can be used in single-emitter DF. The existence of multiple peaks would indicate multiple emitters that could be independently listened by selecting beams corresponding to peak locations.

With respect to one useful application of this direction finding capability, one can consider a cellular communications scenario, wherein a full set of DHT beams can be formed for a cell tower to direction find and locate a handset emitter and/or the handset emitter to locate the cell tower. This allows the handset to generate and form only the beam necessary to listen to the cell tower thus greatly reducing real-time complexity.

In most cases it would be logical for the cell tower to direction find on the handset uplink channel and pass the relative bearing information to the cellular handset to use in selecting a beam to listen to. If the cellular handset can access the Global Positioning System (GPS), then passing the GPS coordinates of the controlling base-station antenna to the handset would be sufficient for the handset to adjust beam selection until handoff to a new cell tower. It is often the case that multiple cell towers will operate in combination during transitions and the relative line of bearings from the handset to each cell tower and vice versa, could be used to actually improve on the handset's GPS estimate of its location via DF Fixing/Emitter Location algorithms that are generally known.

All of the above discussion works for both radio frequency and acoustic forms of waves. In the case of air acoustics, a particular application of interest is the location of gunshot noises in order to protect soldiers from sniper attacks.

Single RF Channel Implementation

The systems and methods described above can be used with a single RF channel implementation, such as that described in "a compact digital beam forming SMILE array for mobile communications," Goshi, et al, *IEEE Transactions on Microwave Theory and Techniques*, Vol. 52, No. 12, December 2004. As described in the article, which is incorporated herein by reference, an N-element antenna array can be used with a multiplexing feed network, a digital sequence generator, and a single RF channel. The single RF channel includes a low noise amplifier (LNA) and a mixer for down conversion. In an IF-baseband processing block, the signals are demultiplexed, provided to low pass filters (LPFs) to recover original signals, converted into digital form in ADCs, and then provided to a digital beam forming block. These components would generally replace the tuning and quadrature sampling blocks 22 shown in FIG. 2. As described in the article, to avoid aliasing, each signal is switched at or above the Nyquist rate with respect to the modulation bandwidth such that the frequency is greater than the product of N channels switched in each cycle and single bandwidth B. This implementation is particularly desirable to produce needed hardware and can be especially useful where smaller size is an improvement, such as in a handset or other compact device.

Cellular Communication Implementation

While there have been a number of references to the use of the technologies described above for implementations with radio communications and cellular communications, this section summarizes some of the features and benefits in this field.

As is generally known, cell phones are interference sources to other cell phones, and other RF interference competes with cell phone signals as well. A cellular antenna collects all signals in its field of view, which can be omni-directional (360°) or based on some numbers of sectors, often three sectors of 120° each. With the systems and methods described above, narrow beam formation can be added to current technology to span the station or sectors with a set of narrow spatial beams, with a beam only sensing the signal in a narrow field of view. In this case, the field of view, rather than being 360° or 120°, now becomes a beam width. It is desirable for this beam width to be about 10° or less, but it can also be about 5° or less or even 3° or less.

By using azimuthal beam formation for spatial discrimination, a signal to noise ratio can be increased for better quality and spectral efficiency. The signal to noise ratio gain can be greater than about 5 DB or greater than about 10 DB, or up to about 20 DB. The array gain against RF interference is proportional to the reduction in the beam width. By using geo-location technology such as GPS, the beam forming can be coordinated between the handset and the base station.

Currently, a cellular base station forms multiple simultaneous beams to span the field of view, e.g., a 120° sector. If the cell phone can be located by the base station, the base station can direct the handset where to look with a single beam. Compared to other beam forming approaches, the methods described above allow an entire group of required beams to performed in a single step with one linear transform. The systems and methods can result in higher resolution, i.e., reduced beam width, for a constrained antenna size and can produce greater array gain. The system can form multiple beams or a single beam at a cellular handset unit.

The systems and methods described above are also useful with multipath environments, such as cellular communications. As is generally known, with multipath propagation, signals can combine in a destructive manner thereby creating fading. These multiple paths can arise from various reflections. For example, there could be a clear line of sight (LOS) between a handset and a cellular tower, but the signal from the cell tower, in addition to having a direct path to a handset, could also reflect off of buildings or other structures and thus be received at a slightly different time from the direct path. The use of retransmission, error correcting codes, rake receivers, and methods are all known for dealing with multipath. The systems and methods described above can help to mitigate multipath fading, and coordination between a base station and a handset can allow a single beam to be formed at the handset. As noted above, the systems and methods can use a small number of elements and can interpolate spatially to give a benefit that is similar to the use of a much larger number of physical elements. In one example, three antenna elements can be used. After I and Q sampling is done, there are time samples from the three antenna elements. These elements can be provided to an interpolation filter that can increase the number, for example, by a factor of 2 or more, a factor of 3 or more, a factor of 4 or more, 5 or more, or 6 or more. In one example, the interpolation filter is used to create a "synthetic array" of 19 elements. The DHT complex matrix multipliable block can further increase the effective number of beams, thereby producing I and Q samples for an even greater number of beams, such as 91 beams.

The inventions described above can be implemented in one or more of the following: general purpose processors, application-specific integrated circuits (ASICs), data cards, controllers, processors, and any other processing device, referred to here generally as a processor. The functions can be implemented in any necessary combination of hardware and software. To the extent that the inventions are implemented in whole or in part with software that can be used on different types of general purpose processors, the software can be kept on medium, such as magnetic disc, optical disc, or solid state memory, and implemented on a computer such that when installed the software is executed as a series of steps on such processor. Various processes, such as analog to digital converters and sampling functionality can occur within dedicated hardware processes, and/or can be implemented in a form of program processor, any of which would constitute circuitry for performing the function.

While certain embodiments have been described, others are within the scope of the claims.

The invention claimed is:

1. A device for receiving signals from a transmitting device, the device comprising:
   an array of N antennas receiving N signals, where N is a natural number greater than or equal to three;
   sampling circuitry for deriving digital data from the N antennas;
   a spatial filter for receiving digital data from the sampling circuitry;
   a spatial interpolator for receiving signals derived from the spatial filter and providing M interpolated signals using a Hermetic transform, where M>N, M representing a set of beams; and
   a selector for selecting one of the beams to identify a location of the transmitting device.

2. The device of claim 1, wherein the digital data includes in-phase and quadrature data.

3. The device of claim 1, wherein the sampling circuitry uses oversampling.

4. The device of claim 1, wherein the interpolator applies a matrix based on a selected cost function.

5. The device of claim 4, wherein the spatial filter uses pre-stored matrices.

6. A device for receiving signals from a transmitting device, the device comprising:
   an array of N antennas receiving N signals, where N is a natural number greater than or equal to three;
   sampling circuitry for deriving digital data from the N antennas;
   a spatial filter for obtaining signals from a desired sector;
   a spatial interpolator for receiving signals derived from the digital data and providing M interpolated signals, where M>N, M representing a set of beams;
   a selector for selecting one of the beams to identify a location of the transmitting device; and
   a second spatial filter for receiving output signals derived from the spatial interpolator, and a second spatial interpolator for receiving the filtered signals from the second spatial filter and providing P beams, where P>M.

7. The device of claim 1, wherein the antennas receive radiofrequency (RF) signals.

8. A method for receiving signals from a transmitting device, the method comprising:
   receiving N signals with an array of N antennas, where N is a natural number greater than or equal to three;
   sampling the signals to derive digital data from the N elements;
   spatial filtering for filtering sampled signals;
   spatially interpolating the N signals to provide M interpolated signals, where M>N, M representing a set of beams; and
   selecting one of the beams to identify a location of the transmitting device.

9. The method of claim 8, wherein the interpolating includes applying a matrix based on a selected cost function.

10. A method for receiving signals from a transmitting device, the method comprising:
    receiving N signals with an array of N antennas, where N is a natural number greater than or equal to three;
    sampling the signals to derive digital data from the N elements;
    spatial filtering for obtaining signals from a desired sector;
    spatially interpolating the N signals to provide M interpolated signals, where M>N, M representing a set of beams;
    selecting one of the beams to identify a location of the transmitting device; and
    a second spatial filtering for receiving output signals derived from the spatial interpolating, and a second spatial interpolating for receiving the filtered signals from the second spatial filtering and providing P beams, where P>M.

11. The method of claim 8, wherein the sampling includes oversampling.

12. The method of claim 10, wherein the interpolating includes applying a matrix based on a selected cost function.

13. A device for receiving signals from a transmitting device, the device comprising:
    an array of N antennas receiving N signals, where N is a natural number greater than or equal to three; and
    a processor configured to:
        sample data from the N antennas, and use a Hermetic transform on the sampled data to form M beams, where M>N.

14. The device of claim 13, wherein the processor is further configured to select one of the beams to identify a location of the transmitting device.

15. The device of claim 14, wherein the received signals are RF signals received at a base station from a mobile device.

16. A method for receiving signals from a transmitting device, the method comprising:
   receiving N signals with an array of N antennas, where N is a natural number greater than or equal to three;
   sampling the signals to derive digital data from the N elements; and
   using a Hermetic transform on the sampled data to derive M beams, where M>N.

17. The method of claim 16, further comprising selecting one of the beams to identify a location of the transmitting device.

18. The method of claim 16, wherein the received signals are RF signals received at a base station from a mobile device.

19. The method of claim 16, wherein the antennas are arranged in a cylindrical array.

20. The device of claim 13, wherein the antennas are arranged in a cylindrical array.

* * * * *